US011659581B2

(12) United States Patent
Wang et al.

(10) Patent No.: US 11,659,581 B2
(45) Date of Patent: May 23, 2023

(54) DEVICE AND METHOD FOR MULTI-ACCESS POINT BEAMFORMING IN A WIRELESS NETWORK

(71) Applicant: MediaTek Singapore Pte. Ltd., Solaris (SG)

(72) Inventors: James June-Ming Wang, San Jose, CA (US); Yongho Seok, San Jose, CA (US); James Chih-Shi Yee, San Jose, CA (US); Jianhan Liu, San Jose, CA (US); Thomas Edward Pare, Jr., San Jose, CA (US)

(73) Assignee: Mediatek Singapore PTE. LTD., Singapore (SG)

(*) Notice: Subject to any disclaimer, the term of this patent is extended or adjusted under 35 U.S.C. 154(b) by 50 days.

(21) Appl. No.: 16/842,652

(22) Filed: Apr. 7, 2020

(65) Prior Publication Data
US 2020/0322964 A1 Oct. 8, 2020

Related U.S. Application Data

(60) Provisional application No. 62/830,635, filed on Apr. 8, 2019.

(51) Int. Cl.
| | |
|---|---|
| *H04W 72/08* | (2009.01) |
| *H04B 17/336* | (2015.01) |
| *H04W 16/28* | (2009.01) |
| *H04W 24/10* | (2009.01) |
| *H04W 72/04* | (2023.01) |
| *H04W 80/08* | (2009.01) |

(Continued)

(52) U.S. Cl.
CPC ........ *H04W 72/541* (2023.01); *H04B 17/336* (2015.01); *H04W 16/28* (2013.01); *H04W 24/10* (2013.01); *H04W 72/046* (2013.01); *H04W 80/08* (2013.01)

(58) Field of Classification Search
CPC ... H04W 72/082; H04W 16/28; H04W 24/10; H04W 72/046; H04W 80/08; H04B 17/336; H04B 7/0617; H04B 7/0632; H04B 7/024; H04J 11/0023
See application file for complete search history.

(56) References Cited

U.S. PATENT DOCUMENTS

| | | | | |
|---|---|---|---|---|
| 6,055,277 A | * | 4/2000 | Stephens ............... | H04L 1/0071 |
| | | | | 714/701 |
| 2006/0262767 A1 | * | 11/2006 | Peleg .................... | H04W 16/28 |
| | | | | 370/338 |

(Continued)

*Primary Examiner* — Habte Mered (57) ABSTRACT

Embodiments of the present invention provide a method and device for multi-AP beamforming (e.g., nulling) and spatial reuse to mitigate interference and improve the performance of MAP wireless networks. According to one embodiment, multiple APs agree to collaborate in multi-AP beamforming, transmissions of received PDDUs are measured to determine interference information, the APS generate interference maps, and the APs perform joint and Multi-AP beamforming in a first and second BSS to avoid/mitigate interference of the MAP wireless network. An RTS and CTS frame exchange sequence can be performed prior to Multi-AP beamforming between BSSs using a flag/indicator in the RTS frame to indicate coordinated transmission, or an UL trigger frame can be used to indicate a coordinated UL transmission.

17 Claims, 12 Drawing Sheets

(51) Int. Cl.
    *H04W 72/541*    (2023.01)
    *H04W 72/044*    (2023.01)

(56) References Cited

U.S. PATENT DOCUMENTS

| | | | | |
|---|---|---|---|---|
| 2013/0115999 | A1* | 5/2013 | Sirotkin | H04W 52/40 |
| | | | | 455/522 |
| 2014/0098695 | A1* | 4/2014 | Jeong | H04B 7/0619 |
| | | | | 370/252 |
| 2015/0270880 | A1* | 9/2015 | Harel | H04W 88/08 |
| | | | | 370/338 |
| 2015/0288427 | A1* | 10/2015 | Wang | H04W 72/1284 |
| | | | | 370/329 |
| 2015/0295629 | A1* | 10/2015 | Xia | H04B 7/0695 |
| | | | | 370/329 |
| 2016/0165630 | A1* | 6/2016 | Oteri | H04W 74/04 |
| | | | | 370/336 |
| 2018/0124694 | A1* | 5/2018 | Pefkianakis | H04W 48/20 |
| 2018/0262936 | A1* | 9/2018 | Zhou | H04J 11/0053 |
| 2019/0090162 | A1 | 3/2019 | Roy et al. | |
| 2020/0045555 | A1* | 2/2020 | Huang | H04W 4/06 |
| 2020/0106579 | A1* | 4/2020 | Cherian | H04L 5/0032 |
| 2020/0213160 | A1* | 7/2020 | Doostnejad | H04L 25/0224 |
| 2020/0287664 | A1* | 9/2020 | Fang | H04L 1/1812 |
| 2020/0296592 | A1* | 9/2020 | Hohne | H04W 16/28 |
| 2021/0136599 | A1* | 5/2021 | Yang | H04L 5/0035 |

\* cited by examiner

DEVICE AND METHOD FOR MULTI-ACCESS POINT BEAMFORMING IN A WIRELESS NETWORK

CROSS-REFERENCE TO RELATED APPLICATIONS

This application claims the benefit of and priority to provisional patent application Ser. No. 62/830,635, entitled, "Multi-AP Collaborative Beamforming and Transmission," with filing date Apr. 8, 2019, by James Wang, et al., which is hereby incorporated by reference in its entirety.

FIELD

Embodiments of the present invention generally relate to the field of wireless communications. More specifically, embodiments of the present invention relate to systems and methods for multi-access point collaboration within a wireless communication network.

BACKGROUND

Modern electronic devices typically send and receive data with other electronic devices wirelessly, e.g., using Wi-Fi within a Wi-Fi network, and the performance of Wi-Fi networks can be improved by using more than one wireless access point device (wireless AP). By collaborating among multiple APs, the overall efficiency and performance of the Wi-Fi network can be greatly improved, and poor network connections resulting from obstructions and interference can be avoided. Moreover, a wireless AP in a MAP wireless network can fail without disrupting the entire wireless network since another wireless AP can take over.

In a MAP wireless network, multiple wireless APs engaged in the collaboration and multiple wireless stations (STAs) can cause interference during cooperative Multi-AP transmission. To prevent or mitigate this interference, the output of the physical antennas of the wireless APs can be modified using beamforming so that different channels used by the collaborative APs and the associated STAs do not cause interference. Beamforming techniques are commonly applied to cancel interfering signals and produce a strong beam to communicate a data signal, for example, using computed weighted vectors.

Therefore, what is needed is an approach to collaborating between wireless networks that prevents or mitigates interference caused by multiple BSSs to improve the performance of MAP wireless networks.

SUMMARY

More specifically, what is needed is an approach to multi-AP collaboration that uses beamforming from one or multiple devices to prevent or mitigate interference, resulting in improved performance of MAP wireless networks. Accordingly, embodiments of the present invention provide a method and device for signaling multi-AP beamforming (e.g., nulling) and spatial reuse to mitigate interference and improve the performance of MAP wireless networks. By coordinating multiple wireless APs in a MAP wireless network, the wireless APs can cooperate to efficiently service wireless STAs and advantageously mitigate signal interference and degradation caused by signal obstructions such as walls, structures, objects, etc. Beamforming, including nulling, can be used to prevent or mitigate interference between devices of cooperating basic service sets (BSSs).

One goal of the embodiments of the present invention is to improve performance (e.g., throughput) of MAP wireless networks while keeping overhead relatively low for maintaining up-to-date channel state information.

According to one embodiment, a method of coordinating beamforming between a first wireless access point (AP) and a second wireless AP in a multi-AP (MAP) wireless network is disclosed. The method includes establishing an agreement to collaborate between a first wireless AP and a second wireless AP, where the first wireless AP is operable to service a first basic service set (BSS) and the second wireless AP is operable to service a second BSS, wireless stations (STAs) of the first BSS measuring transmission of received PDDUs from wireless STAs in the second BSS to determine interference information, collecting interference information measured by the wireless STAs in the first BSS, establishing an interference map, and performing Multi-AP beamforming to service the first BSS and the second BSS. The multi-AP beamforming is operable to mitigate interference between the first BSS and the second BSS.

According to some embodiments, the interference maps are established based on the interference information measured by the wireless STAs in the first BSS, and where the Multi-AP beamforming is performed based on the interference maps.

According to some embodiments, the interference map indicates interference measured during transmissions from wireless STAs in the second BSS to wireless STAs in the first BSS.

According to some embodiments, the wireless STAs calibrating the receiver nulling while measuring transmission of received PDPUs.

According to some embodiments, the second wireless AP uses a trigger frame to indicate uplink transmission from a first wireless STA of the second BSS, the first wireless AP continues the performing Multi-AP beamforming by nulling toward the second wireless AP, and the first wireless AP selects a recipient STA of the first BSS according to interference map to avoid interference.

According to some embodiments, the establishing an agreement to collaborate includes the first wireless AP indicating a collaborative uplink transmission in an uplink trigger frame.

According to another embodiment, a wireless access point (AP) is disclosed. The wireless AP includes a processor, a memory coupled to the processor and including instructions executed by the processor to perform a method of Multi-AP beamforming for a multi-AP (MAP) wireless network. The method includes the wireless establishing an agreement to collaborate with another wireless AP, where the wireless AP is operable to service a first basic service set (BSS) and the another wireless AP is operable to service a second BSS. Wireless stations (STAs) of the first BSS measure transmission of received PDDUs from STAs in the second BSS to determine interference information, and the wireless AP collects interference information measured by the STAs in the first BSS. The wireless AP establishes an interference map, and the wireless AP and the another wireless AP perform Multi-AP beamforming to service the first BSS and the second BSS. The Multi-AP beamforming is operable to mitigate interference between the first BSS and the second BSS.

According to another embodiment, a non-transitory computer-readable storage medium having embedded therein program instructions, which when executed by one or more processors of a device, causes the device to execute a process for Multi-AP beamforming in a multi-AP (MAP)

wireless network. The method includes a wireless AP establishing an agreement to collaborate with another wireless AP, where the wireless AP is operable to service a first basic service set (BSS) and the another wireless AP is operable to service a second BSS, wireless stations (STAs) of the first BSS measuring transmission of received PDDUs from STAs in the second BSS to determine interference information, collecting interference information measured by the STAs in the first BSS, establishing an interference map, and performing Multi-AP beamforming to service the first BSS and the second BSS. The Multi-AP beamforming is operable to mitigate interference between the first BSS and the second BSS.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follow are presented and discussed in terms of a method. Although steps and sequencing thereof are disclosed in a figure herein (e.g., FIG. 11) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "configuring," "coordinating," "storing," "transmitting," "authenticating," "identifying," "requesting," "reporting," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Novel Beam Forming Process for Map Wireless Networks

As used herein, the term "EHT" may refer to a recent generation of wireless communication (Wi-Fi) known as Extremely High Throughput (EHT) and is defined according to the IEEE 802.11be standards. The term station (STA) refers to an electronic device capable of sending and receiving data over Wi-Fi that is not operating as an access point (AP).

Embodiments of the present invention provide an apparatus and method for Multi-AP beamforming in a Multi-AP (MAP) wireless network. By coordinating multiple wireless AP in a MAP wireless network, the wireless APs can cooperate to efficiently service wireless STAs and advantageously mitigate signal interference and degradation caused by signal obstructions such as walls, structures, objects, etc. Beamforming and nulling can be used to prevent or mitigate interference between devices of cooperating basic service sets (BSSs). One goal of the present invention is to improve performance (e.g., throughput) of MAP wireless networks while keeping overhead for maintaining up-to-date channel state information relatively low.

Figure 1:
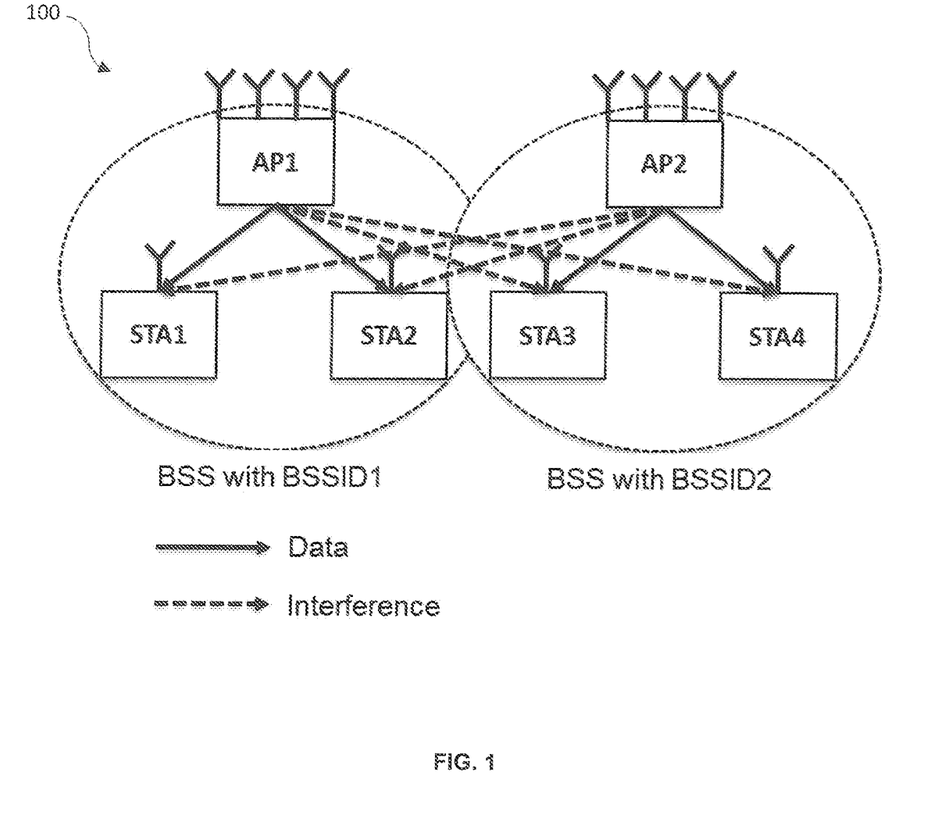
FIG. 1 is a block diagram of an exemplary Multi-AP (MAP) wireless network depicted according to embodiments of the present invention.

With regard to FIG. 1, an exemplary MAP wireless network 100 is depicted according to embodiments of the present invention. When a wireless AP obtains a transmission opportunity frame (TXOP), the wireless AP (e.g., the TXOP holder) can share a portion or resource unit (RU) of the bandwidth granted by the TXOP with one or more other collaborative APs within the TXOP. Sharing the RU can occur in the spatial domain, frequency domain and time domain. Multi-AP beamforming is one of approach to enable sharing the RU in the spatial domain. The wireless AP and the collaborative APs can simultaneously transmit by applying Multi-AP beamforming where the interferences between channels nullify each other (e.g., nulling).

FIG. 1 depicts downlink (DL) transmissions between collaborative AP1 and AP2 services wireless stations STA1, STA2, STA3, and STA4. In this example, AP1, STA1, and STA2 belong to a first basic service set (BSSID1), and AP2, STA3, and STA4 belong to a second basic service set (BSSID2). The dashed lines represent potential interference between channels. The solid lines represent downlink data transmissions. It is appreciated that the APs and the STAs can also be configured to perform beamforming for cooperative uplink (UL) transmissions.

Figure 2:
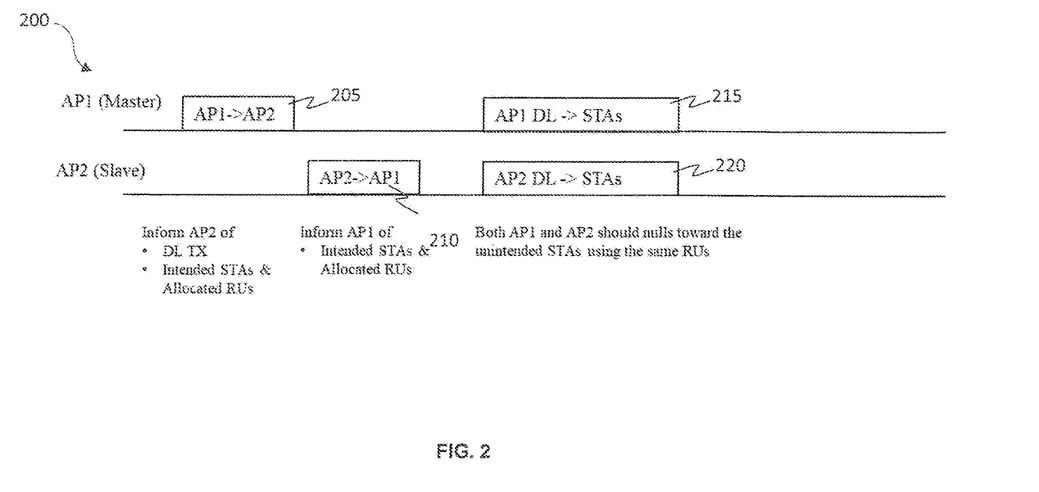
FIG. 2 depicts an exemplary data transmission and timing diagram for performing Multi-AP beamforming in a MAP wireless network according to embodiments of the present invention.

FIG. 2 depicts an exemplary data transmission and timing diagram 200 for signaling Multi-AP beamforming in a MAP wireless network according to embodiments of the present invention. In the embodiment depicted in FIG. 2, Multi-AP beamforming is to be performed for downlink transmissions with a cooperative basic service set (BSS). Channel state information of the AP intended for Multi-AP beamforming (e.g., a neighboring AP) for receiving transmissions from non-AP STAs of a coordinating BSS is required to configure AP1 and AP2 for Multi-AP beamforming in order to perform uplink beamforming transmission. Furthermore, the APs need to know which non-AP STAs to which a neighbor coordinating AP intends to transmit.

Specifically, frame 205 sent from AP1 to AP2 informs AP2 that the coordinating BSS is performing a downlink transmission. Frame 205 can also indicate the intended STAs and allocated resource units (RUs) for performing Multi-AP beamforming for downlink transmissions in BSS1 and BSS2. Frame 210 sent from AP2 to AP1 indicates the intended STAs of BSS2 and allocated resource units (RUs) for performing Multi-AP beamforming for downlink transmissions. FIG. 2 shows an exemplary two way signal handshake between the AP1 and AP2. According to some embodiments, AP1 transmits an additional signaling frame to grant or allocate frequency, time, or spatial resource to AP2 to complete a three way handshake. After the required information is received by AP1 and AP2, downlink transmission frames 215 and 220 are sent from AP1 and AP2 to STAs. AP1 and AP2 null toward the unintended recipient STAs using the same RUs.

The embodiment depicted in FIG. 2 requires a relatively high overhead for maintaining up-to-date channel state information of transmitting STAs and distributing the channel state information from the APs to all recipient STAs. Moreover, collaborative BSS sounding and feedback need to be performed to establish channel state information for joint downlink beamforming.

Figure 3:
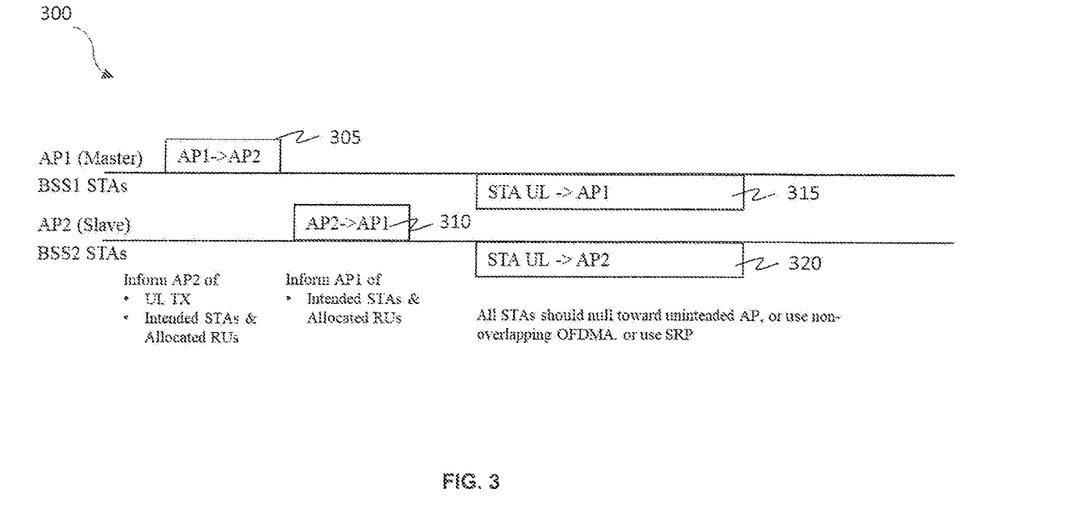
FIG. 3 depicts an exemplary data transmission and timing diagram for performing Multi-AP beamforming in a MAP wireless network according to embodiments of the present invention.

FIG. 3 depicts an exemplary data transmission and timing diagram 300 for signaling Multi-AP beamforming in a MAP wireless network according to embodiments of the present invention. In the embodiment depicted in FIG. 3, Multi-AP beamforming is performed for uplink transmissions in basic service set (BSS) 1 and BSS 2. BSS1 is serviced by cooperative AP1 (master) and BSS2 is serviced by cooperative AP2 (slave). Channel state information (of non-AP STAs transmitting to the neighbor coordinating AP) is required to configure AP1 and AP2 for Multi-AP beamforming in order to perform uplink beamforming transmission. Furthermore, an indication that coordinating BSS is performing an uplink transmission needs to be carried in the uplink trigger frame of its own AP to which it is connected.

Specifically, frame 305 sent from AP1 to AP2 informs AP2 that the coordinating BSS is performing an uplink transmission. Frame 305 can be an uplink trigger frame for example. Frame 305 can also indicate the intended STAs of BSS1 and allocated resource units (RUs) for performing Multi-AP beamforming for uplink transmissions in BSS1 and BSS2. Frame 310 sent from AP2 to AP1 indicates the intended STAs of BSS2 and allocated resource units (RUs) for performing Multi-AP beamforming for uplink transmissions in BSS1 and BSS2. FIG. 3 shows an exemplary two way signal handshake between the AP1 and AP2. According to some embodiments, AP1 transmits an additional signaling frame to grant or allocate frequency, time, or spatial resource to AP2 to complete a three way handshake. After the required information is received by AP1 and AP2, uplink transmission frames 315 and 320 are sent from STAs to AP1 and AP2, respectively. The STAs null toward the unintended AP, use non-overlapping OFDMA, or use (Spatial Reuse Parameter) SRP.

The embodiment depicted in FIG. 3 requires relatively high overhead for maintaining up-to-date channel state information of transmitting STAs to the coordinating (neighbor) APs. Moreover, in some cases, the STA may not be equipped with multiple antennae such that beamforming can be performed to null toward the coordinating (neighbor) APs.

Figure 4:
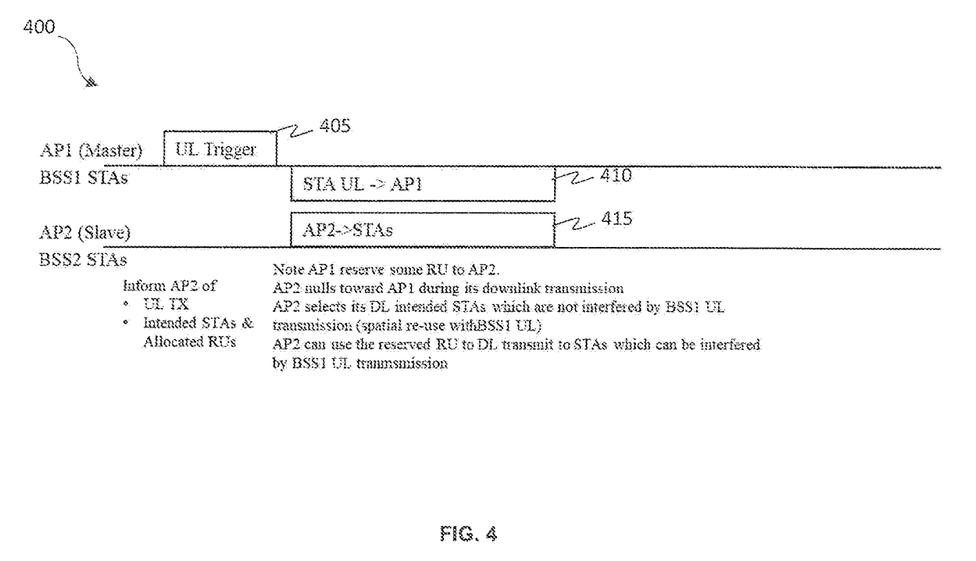
FIG. 4 depicts an exemplary data transmission and timing diagram for performing Multi-AP beamforming in a MAP wireless network with reduced overhead for maintaining up-to-date channel state information between coordinating APs according to embodiments of the present invention.

FIG. 4 depicts an exemplary data transmission and timing diagram 400 for signaling Multi-AP beamforming in a MAP wireless network with reduced overhead for maintaining up-to-date channel state information between coordinating APs according to embodiments of the present invention. AP2 (BSS2) is a beamformer (a "nuller") during its downlink transmission and requires the channel state information from itself to the neighbor coordinating AP (AP1). The channel between coordinating AP-AP tends to be more stable (e.g., changes less frequently). Coordinating APs can monitor beacon frames to detect changes in channel state information.

For BSS1 triggered Uplink transmission and BSS2 (AP2) Downlink Beamforming, BSS1 uplink transmission can interfere with receiving STAs in BSS2. AP2 knows the uplink transmission STAs in BSS1 from its uplink trigger frame and needs to determine which of its own STAs are not interfered by the uplink transmission STAs in BSS1. Before performing a collaborative transmission, AP1 and AP2 establish an agreement to collaborate. AP1 and AP2 send requests to associated STAs to observe transmission from other collaborative BSSs. The STAs can perform and calibrate the receiver nulling while observing the transmissions, and the STAs record interference levels and the IDs of the transmitting STA along with nulling results during the observation.

According to some embodiments, an AP (e.g., AP1) maintains an interference map indicating interference measured during transmissions from STAs in BSS2 to STAs in BSS1. For example, AP1 can request a report from its associated STAs indicating interference information from BSS2. AP1 can receive measurements from STAs in BSS1 indicating the interference information from BSS2. AP1 can also periodically receive reports from STAs in BSS1 in response to a request or AP1 can receive unsolicited reports from STAs in BSS1. AP2 also maintains an interference map indicating interference based on an observation of transmissions from STAs in BSS1 to STAs in BSS2.

As depicted in the transmission sequence of FIG. 4, UL trigger frame 405 sent from AP1 to AP2 informs AP2 that the coordinating BSS is performing a UL transmission and indicates the intended STAs and allocated RUs for coordinated UL transmission. AP1 typically reserves some of the RU for AP2. AP2 can use the reserved RU for DL transmission to STAs which can be determined by uplink transmission of BSS1. AP1 receives UL transmissions 410 from STAs in BSS1. AP2 then selects STAs which are not interfered by BSS1 UL transmission (spatial re-use with BSS1 UL) for DL transmission 415 in BSS2. In this way BSS1 uplink transmission does not interfere with receiving STAs in BSS2. When AP2 transmits frame 415, it nulls toward AP1.

Figure 5:
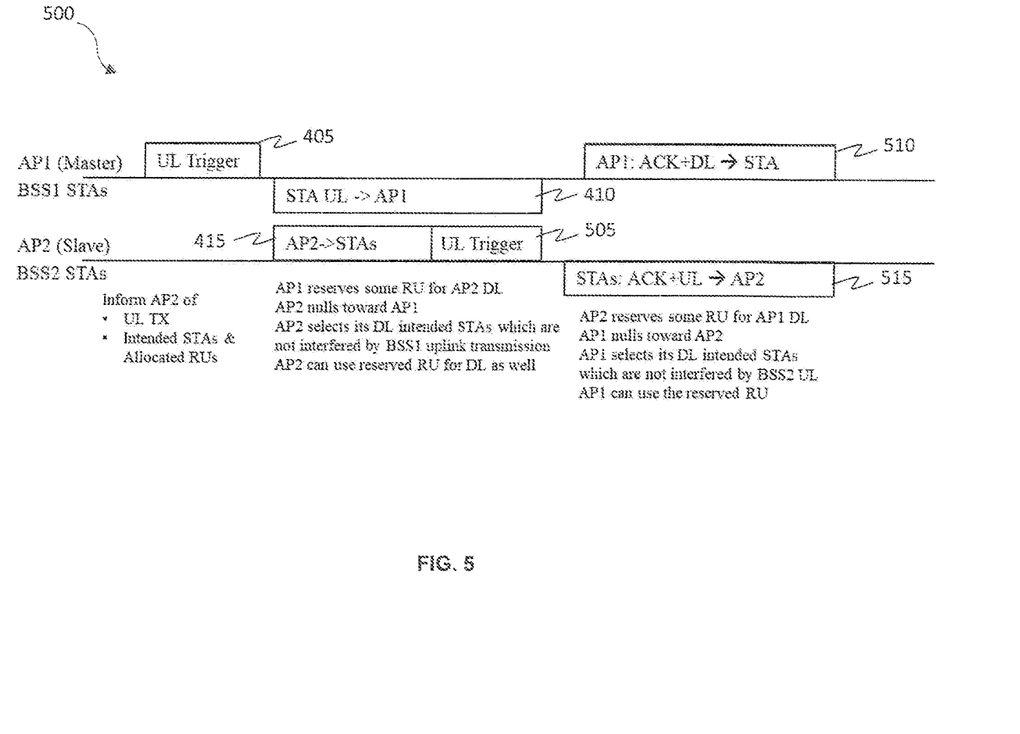
FIG. 5 depicts an exemplary data transmission and timing diagram for performing Multi-AP beamforming in a MAP wireless network to continue a transmission using a UL trigger frame according to embodiments of the present invention.

As depicted in data transmission and trimming diagram 500 in FIG. 5, following the first two transmissions 410 and 415, BSS1 and BSS2 can continue their transmissions by sending UL trigger frame 505 to STAs in BSS2 to perform uplink transmission. AP1 performs downlink transmission 510 by nulling toward AP2 or using SRP from BSS2 to perform transmit power control. AP1 can obtain the trigger frame information for BSS2 UL transmission before deciding which STAs are intended as the recipients of the downlink transmission in order to avoid interference from STAs in BSS2 that may interfere with STAs in BSS1. AP2 reserves some RU to AP1 and the reserved RU can be used by AP1 for performing DL transmission. The triggered STAs in BSS2 then send uplink transmissions 515 to AP2.

According to some embodiments, AP1 can obtain the information carried in a UL trigger frame so that it can select intended recipient STAs which are not interfered with by UL STA transmissions in BSS2. This can be accomplished using a control signaling channel between the collaborative BSSs (e.g., BSS1 and BSS2). Therefore, AP1 can optionally allocate some orthogonal frequency-division multiple access (OFDMA) RU in the AP2 DL Physical Layer Convergence Procedure (PLCP) Protocol Data Unit (PPDU) for control signaling from AP2 to AP1, and no nulling is performed toward AP1 in the OFDMA RU so that the control signal can be received by AP1. Alternatively, AP2 can use a multi-user multiple-input and multiple-output (MU-MIMO) DL transmission, with AP1 being one of the MU recipient for control signaling, or the APs can use multi-band operation with one of the bands used for control signaling for the subsequent transmission information between AP1 and AP2.

Figure 6:
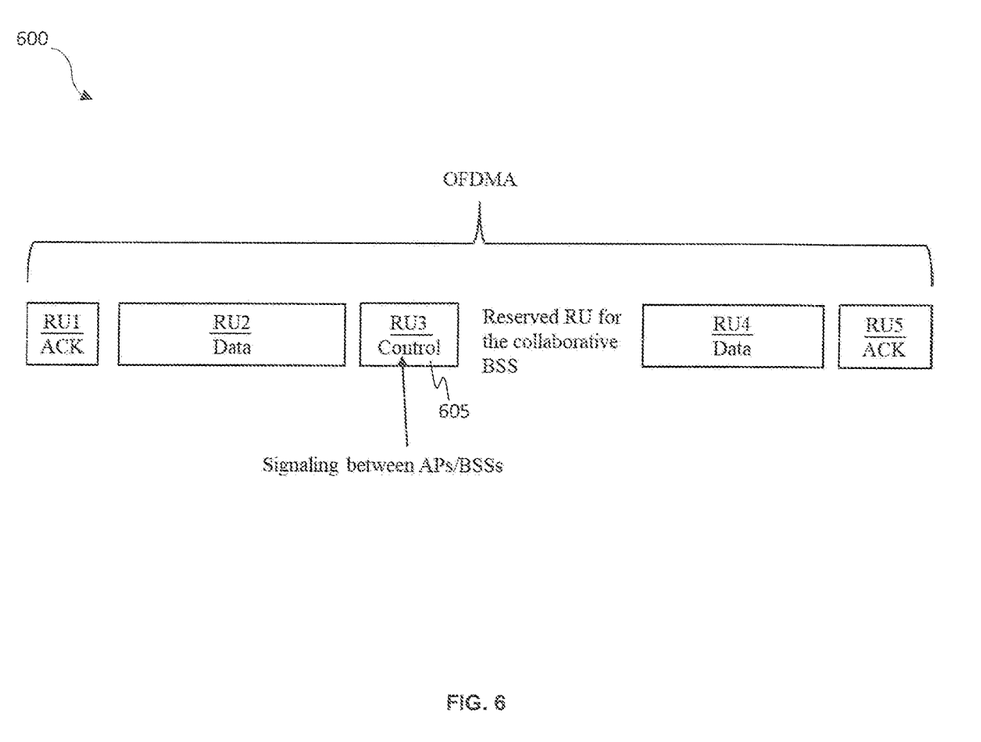
FIG. 6 depicts an exemplary OFDMA packet for control signaling between AP1 and AP2 according to embodiments of the present invention.

FIG. 6 depicts an exemplary OFDMA packet 600 for control signaling between AP1 and AP2 according to embodiments of the present invention. OFDMA packet 600 includes fields RU1-RU5. RU1 and RU5 are acknowledgements (ACKs), RU2 and RU4 carry data, and RU3 carries control information 605. Control information 605 can include signaling information between APs and/or BSSs including trigger frame information as discussed above and other signaling information used to perform Multi-AP beamforming.

Figure 7:
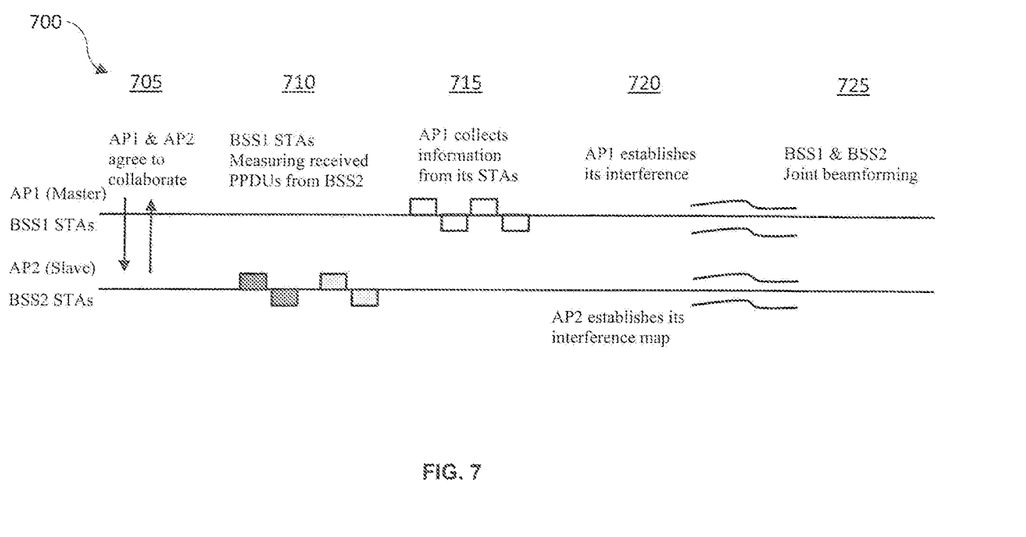
FIG. 7 depicts an exemplary transmission timing diagram including a triggered BSS1 UL and BSS2 DL transmission for performing Multi-AP beamforming according to embodiment of the present invention.

FIG. 7 is an exemplary transmission timing diagram 700 depicting triggered BSS1 UL and BSS2 DL according to an embodiment of the present invention. STAs can perform receiver nulling to prevent being interfered with by UL transmissions in the other BSSs. STAs send interference reports to their own APs to establish an interference map including received signal levels from STAs in the neighbor BSS and the associated IDs, and received signal levels from STAs in neighbor BSSs after performing receiver nulling (along with the associated IDs). The STAs can update/report automatically when the STA observes a change in interference levels, for example.

Figure 8:
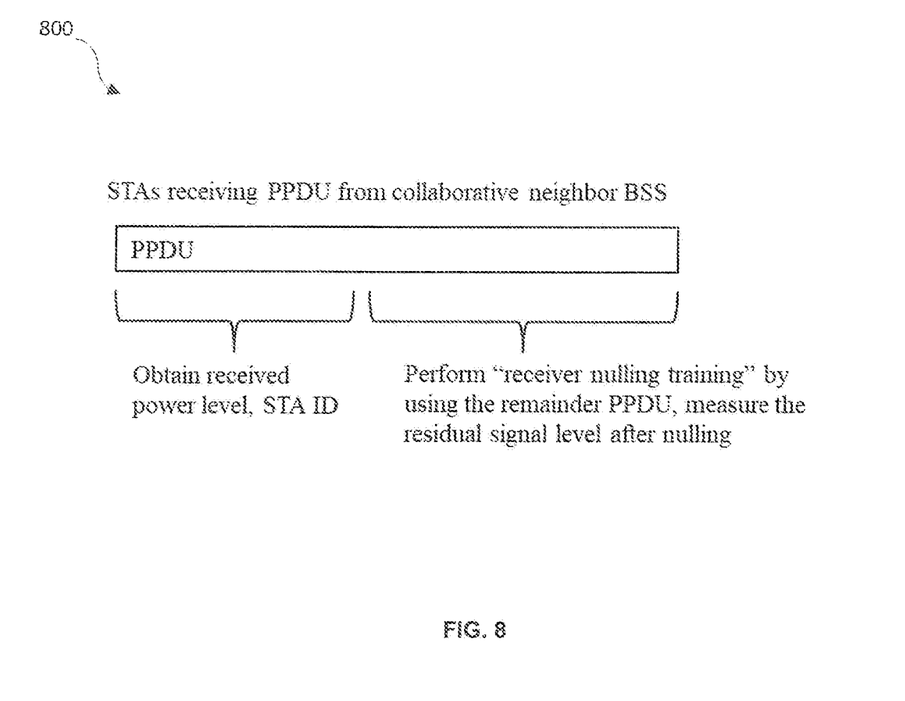
FIG. 8 depicts an exemplary PPDU for performing Multi-AP beamforming according to embodiment of the present invention, where the first portion of the PPDU can be used to obtain the received power level, and the remainder of the PPUD can be used to perform receiver null training and to measure the residual signal level after nulling is performed.

Specifically, as depicted in FIG. 7, at step 705 AP1 and AP2 agree to collaborate in multi-AP beamforming. At step 710, STAs in a first BSS (BSS1) measure the transmission of received PDDUs from STAs in a second BSS (BSS2) to determine interference information. At step 715 AP1 collects interference information measured from the STAs in BSS1, for example, by sending requests for information to the STAs. The information can include the received power level observed during a first portion of a received PPDU, for example, along with associated STA IDs, as described below with regard to FIG. 8. The STAs can also update AP1 when new interference information is available. At step 720, AP1 and AP2 establish interference maps as described above. At step 725, BSS1 and BSS2 perform joint and Multi-AP beamforming to avoid/mitigate interference of the MAP wireless network.

According to some embodiments, an STA can perform receiver nulling to neighbor STAs if it hears the transmission. For example, the STA can record the received power level when receiving a PPDU from a collaborative (neighbor) BSS, along with residual power level after nulling is performed. The STA can train the receiver nulling by adjusting the antenna beamforming matrix, and record the obtained null matrix for use during subsequent Multi-AP beamforming. As depicted in the exemplary PPDU 800 of FIG. 8, according to embodiments of the present invention, the first portion of PPDU 800 can be used to obtain the received power level (associated with an STA ID), and the remainder of PPUD 800 can be used to perform receiver null training and to measure the residual signal level after nulling is performed.

Figure 9:
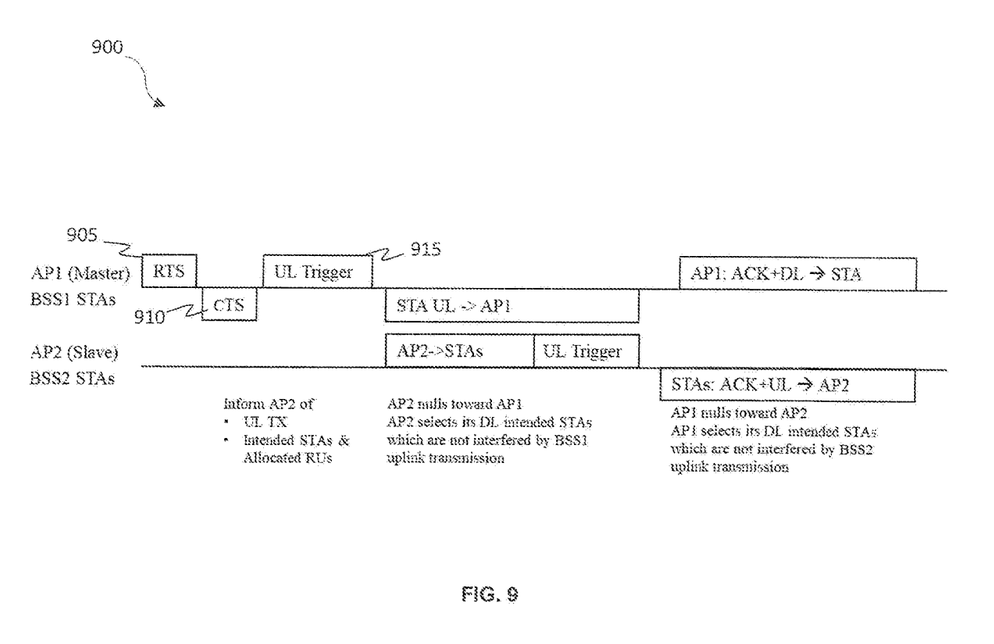
FIG. 9 depicts an exemplary data transmission and timing diagram for performing Multi-AP beamforming using an RTS/CTS frame exchange sequence according to embodiments of the present invention.

According to some embodiments, as depicted in data transmission and timing diagram 900 of FIG. 9, a request to send (RTS) 905 and clear to send (CTS) frame 910 exchange sequence between AP1 and the BSS1 STAs can be performed prior to Multi-AP beamforming between BSS1 and BSS2. To begin Multi-AP beamforming between BSS1 and BSS2, AP1 should signal to AP2 or STAs in BSS2 using a flag/indicator in UL trigger frame 915 or in an RTS frame.

Figure 10:
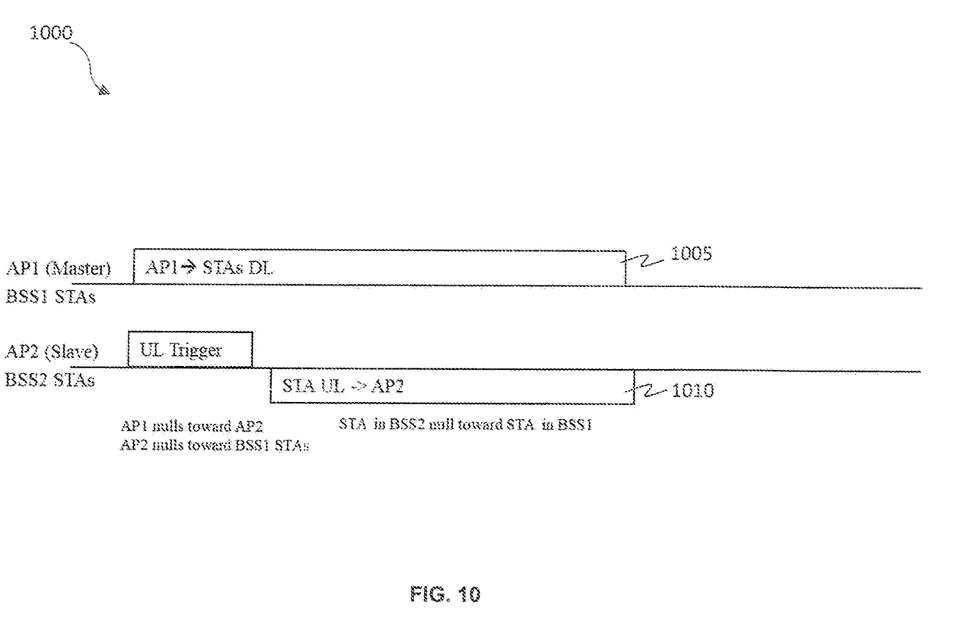
FIG. 10 depicts an exemplary data transmission and timing diagram for performing Multi-AP beamforming for BSS1 DL transmission and BSS2 UL transmission according to embodiments of the present invention.

FIG. 10 depicts an exemplary data transmission and timing diagram 1000 for signaling Multi-AP beamforming for BSS1 DL transmission and BSS2 (AP2) UL transmission according to embodiments of the present invention. Specifically, AP1 nulls toward AP2 in its DL transmission 1005 in BSS1, and STAs in BSS2 null toward the intended BSS1 recipient STA for UL transmission 1010 to AP2 after obtaining channel state information (indicating interference between itself and the neighbor BSS1 STAs).

Figure 11:
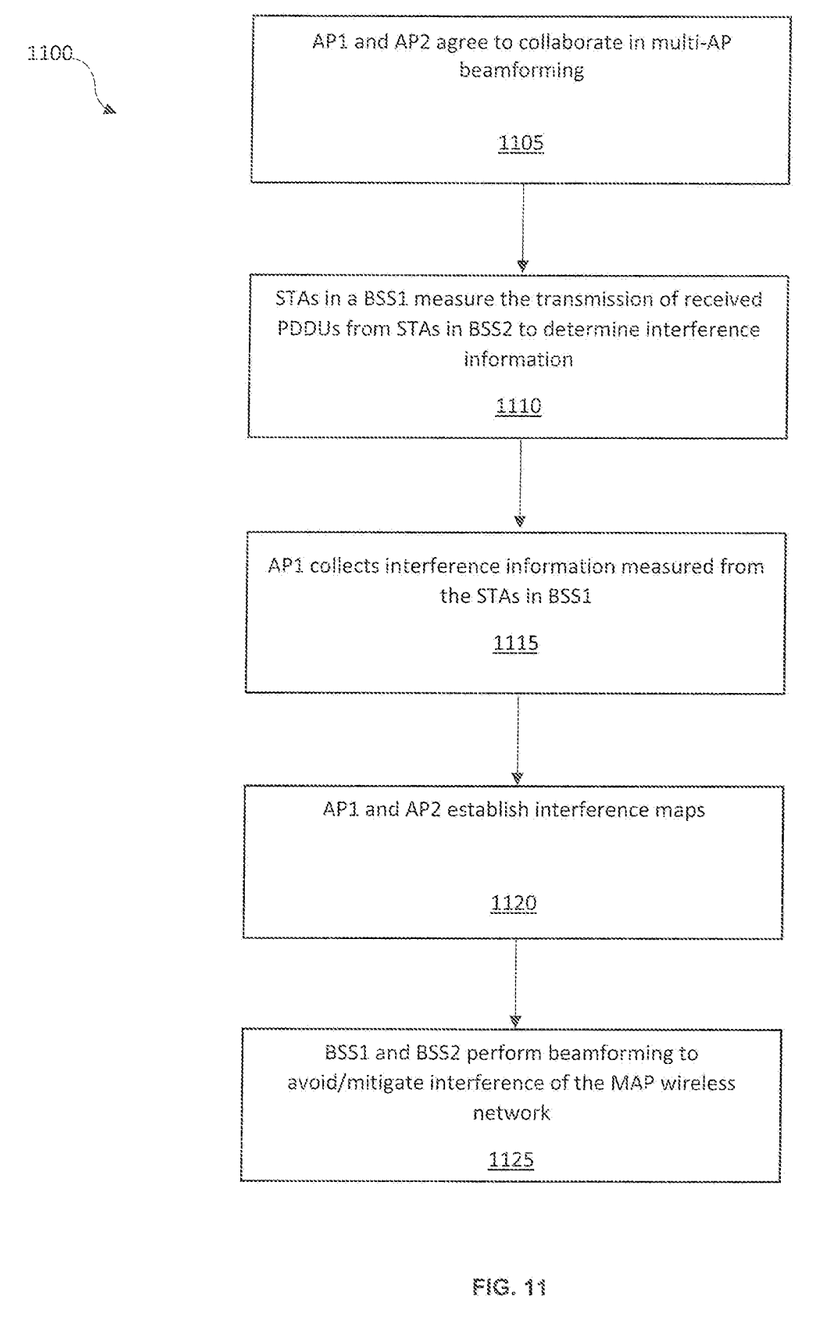
FIG. 11 is a flow chart of an exemplary sequence of computer implemented steps 1100 for performing Multi-AP beamforming in a MAP wireless network according to embodiments of the present invention.

FIG. 11 is a flow chart of an exemplary sequence of computer implemented steps of a process 1100 for performing Multi-AP beamforming in a MAP wireless network according to embodiments of the present invention.

At step 1105, AP1 and AP2 agree to collaborate in multi-AP beamforming. AP1 and AP2 are within a wireless communication network.

At step 1110, STAs in a first BSS (BSS1) measure the transmission of received PDDUs from STAs in a second BSS (BSS2) to determine interference information.

At step 1115, AP1 collects interference information measured from the STAs in BSS1, for example, by sending requests for information to the STAs and receiving responses therefrom. The STAs can also update AP1 when new interference information is available.

At step 1120, based on the received interference information, AP1 and AP2 establish interference maps as described above. For example, APs can request a report from its associated STAs indicating interference information from BSS2. AP1 can receive measurements from STAs in BSS1 indicating the interference information from BSS2. AP1 can also periodically receive reports from STAs in BSS1 in response to a request or AP1 can receive unsolicited reports from STAs in BSS1. AP2 also maintains an interference map indicating interference based on an observation of transmissions from STAs in BSS1 to STAs in BSS2.

At step 1125, BSS1 and BSS2 perform joint and Multi-AP beamforming to avoid/mitigate interference of the MAP wireless network.

Exemplary Computer Controlled System

Figure 12:
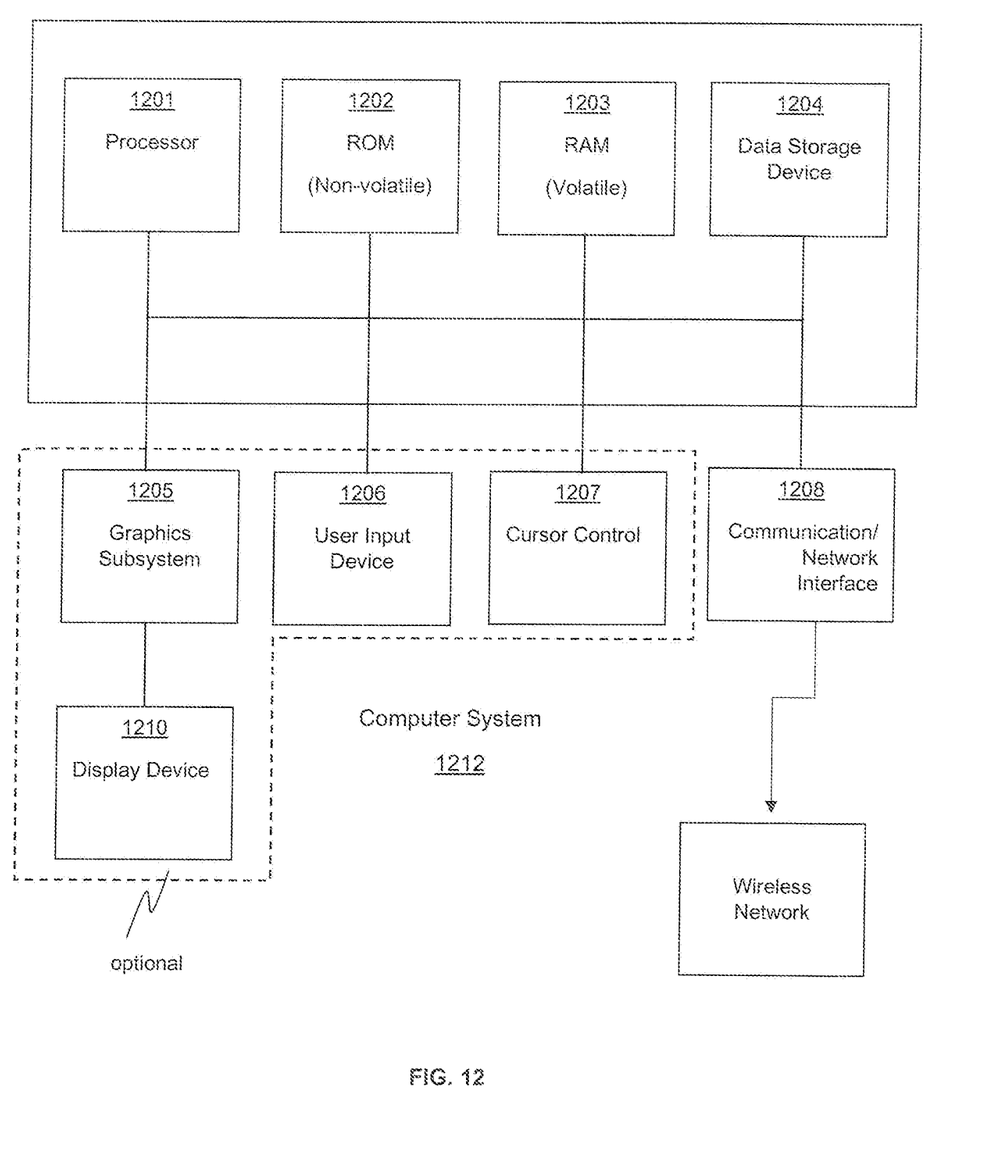
FIG. 12 is a block diagram depicting an exemplary computer system platform upon which embodiments of the present invention may be implemented.

Embodiments of the present invention are drawn to electronic systems for performing Multi-AP beamforming in a MAP wireless network. The following discussion describes one such exemplary electronic system or computer system that can be used as a platform for implementing embodiments of the present invention. The exemplary computer system 1212 can be a wireless AP or a wireless STA, for example.

In the example of FIG. 12, the exemplary computer system or wireless device includes a central processing unit (such as a processor or a CPU) 1201 for running software applications and optionally an operating system. Read-only memory 1202 and random access memory 1203 store applications and data for use by the CPU 1201. Data storage device 1204 provides non-volatile storage for applications and data and may include fixed disk drives, removable disk drives, flash memory devices, and CD-ROM, DVD-ROM or other optical storage devices. The optional user inputs 1206 and 1207 comprise devices that communicate inputs from one or more users to the computer system 1212 (e.g., mice, joysticks, cameras, touch screens, and/or microphones).

A communication or network interface 408 includes a plurality of transceivers and allows the computer system 1212 to communicate with other computer systems, networks, or devices via an electronic communications network, including wired and/or wireless communication and including an Intranet or the Internet (e.g., 802.11 wireless standard). According to embodiments of the present invention, the communication or network interface 1208 can operate multiple transceivers simultaneously. The communication or network interface 1208 can further include a cooperative management unit for coordinating the data sent and/or received by the transceivers. The communication or network interface 1208 and can include a dual band interface that can operate in multiple bands simultaneously, such as 2.4 GHz, 5 GHz, and/or 6 GHz. Various back-off procedures can be performed by the computer system 1212 to synchronize simultaneous communication over the multiple transceivers. Moreover, the network interface 1208 can be configured to perform Multi-AP beamforming in a MAP wireless network to prevent or mitigate interference with neighboring BSSs and APS of the MAP wireless network.

The optional display device 1210 may be any device capable of displaying visual information in response to a signal from the computer system 1212 and may include a flat panel touch sensitive display, for example, and may be remotely disposed. Display 1210 can be used to display a QR code, as described above. The components of the computer system 1212, including the CPU 1201, memory 1202/1203, data storage 1204, user input devices 1206, and graphics subsystem 1205 may be coupled via one or more data buses.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Embodiments of the present invention are thus described. While the present invention has been described in particular embodiments, it should be appreciated that the present invention should not be construed as limited by such embodiments, but rather construed according to the following claims.

What is claimed is:

1. A method of coordinating beamforming in a multi-AP (MAP) wireless network, the method comprising:
    establishing an agreement to collaborate between a first wireless AP and a second wireless AP, wherein the first wireless AP services a first basic service set (BSS) and the second wireless AP services a second BSS, and wherein further wireless stations (STAs) of the first BSS measure Physical Layer Convergence Procedure (PLCP) Protocol Data Units (PPDUs) received from wireless STAs in the second BSS to determine first interference information, and the wireless STAs of the second BSS measure PPDUs received from the wireless STAs in the first BSS to determine second interference information;
    calibrating a receiver nulling while measuring a strength of the PDPUs received;
    collecting the first interference information and the second interference information;
    establishing interference maps based on the first interference information and the second interference information; and performing Multi-AP beamforming to service the first BSS and the second BSS according to the interference maps, wherein the Multi-AP beamforming is operable to mitigate interference between the first BSS and the second BSS.

2. The method as described in claim 1, wherein the interference map is established based on the interference information measured by the wireless STAs in the first BSS, the performing Multi-AP beamforming is performed based on the interference maps, the second wireless AP selects a recipient STA of a downlink transmission in the second BSS, and wherein the recipient STA is not interfered with other transmissions in the first BSS.

3. The method as described in claim 1, wherein the performing Multi-AP beamforming comprises the second wireless AP performing a downlink transmission by nulling toward the first wireless AP to avoid interference of uplink transmissions of the of the first BSS according to the interference maps.

4. The method as described in claim 1, further comprising determining trigger frame information of an uplink transmission in the first BSS and determining an intended recipient wireless STAs according to the trigger frame information.

5. The method as described in claim 1, wherein the establishing an agreement to collaborate comprises the first wireless AP indicating a collaborative uplink transmission in an uplink trigger frame.

6. The method as described in claim 1, wherein the second wireless AP uses a trigger frame to indicate uplink transmission from a first wireless STA of the second BSS, wherein the first wireless AP continues the performing Multi-AP beamforming by nulling toward the second wireless AP, and further comprising the first wireless AP selecting a recipient STA of the first BSS according to interference map to avoid interference.

7. A wireless access point (AP) comprising:
a processor operable to perform a method of Multi-AP beamforming for a multi-AP (MAP) wireless network, the method comprising:
the wireless AP establishing an agreement to collaborate with another wireless AP, wherein the wireless AP is operable to service a first basic service set (BSS) and the another wireless AP is operable to service a second BSS, and wherein further wireless stations (STAs) of the first BSS measure Physical Layer Convergence Procedure (PLCP) Protocol Data Units (PPDUs) received from wireless STAs in the second BSS to determine interference information;
the wireless AP collecting interference information measured by the wireless STAs in the first BSS;
the wireless AP establishing an interference map based on the interference information; and
the wireless AP performing Multi-AP beamforming with the another wireless AP to service the first BSS and the second BSS,
wherein the performing Multi-AP beamforming is operable to mitigate interference between the first BSS and the second BSS, and
wherein the wireless STAs calibrate a receiver nulling while measuring a strength of the PDPUs received.

8. The wireless AP as described in claim 7, wherein the interference map is established based on the interference information measured by the wireless STAs in the first BSS, and wherein the performing Multi-AP beamforming is performed based on the interference map.

9. The wireless AP as described in claim 8, wherein information of the interference map indicates interference measured during transmissions from wireless STAs in the second BSS to wireless STAs in the first BSS.

10. The wireless AP as described in claim 7, wherein the wireless AP determines trigger frame information of an uplink transmission in the first BSS and determines an intended recipient wireless STAs according to the trigger frame information.

11. The wireless AP as described in claim 7, wherein the establishing an agreement to collaborate comprises the wireless AP indicating a collaborative uplink transmission in an uplink trigger frame.

12. The wireless AP as described in claim 7, wherein the another wireless AP uses a trigger frame to indicate uplink transmission from a first wireless STA of the second BSS, wherein the wireless AP continues the performing Multi-AP beamforming by nulling toward the another wireless AP, and further comprising the wireless AP selecting a recipient STA of the first BSS according to interference map to avoid interference.

13. A non-transitory computer-readable storage medium having embedded therein program instructions, which when executed by one or more processors of a device, causes the device to execute a method for Multi-AP beamforming in a multi-AP (MAP) wireless network, the method comprising:
establishing an agreement to collaborate between a first wireless AP and a second wireless AP, wherein the first wireless AP is operable to service a first basic service set (BSS) and the second wireless AP is operable to service a second BSS, and wherein wireless stations (STAs) of the first BSS measure Physical Layer Convergence Procedure (PLCP) Protocol Data Units (PPDUs) received from wireless STAs in the second BSS to determine interference information, wherein the wireless STAs calibrate a receiver nulling while measuring a strength of the PDPUs received;
collecting interference information measured by the wireless STAs in the first BSS;
establishing an interference map; and
performing Multi-AP beamforming to service the first BSS and the second BSS,
wherein the performing Multi-AP beamforming is operable to mitigate interference between the first BSS and the second BSS.

14. The computer-readable storage medium as described in claim 13, wherein the interference map is established based on the interference information measured by the wireless STAs in the first BSS, and wherein the performing Multi-AP beamforming is performed based on the interference map.

15. The non-transitory computer-readable storage medium as described in claim 14, wherein the information of the interference map indicates interference measured during transmissions from wireless STAs in the second BSS to wireless STAs in the first BSS.

16. The computer-readable storage medium as described in claim 13, wherein the method further comprises determining trigger frame information of an uplink transmission in the first BSS and determining an intended recipient wireless STAs according to the trigger frame information.

17. The computer-readable storage medium as described in claim 13, wherein the establishing an agreement to collaborate comprises the first wireless AP indicating a collaborative uplink transmission in an uplink trigger frame.

* * * * *